(12) United States Patent
Rottler et al.

(10) Patent No.: US 6,176,650 B1
(45) Date of Patent: Jan. 23, 2001

(54) APPARATUS AND METHOD FOR CUTTING A BORE INCLUDING AUTOMATIC SYSTEM FOR RETRACTING THE CUTTING TOOL

(75) Inventors: Andrew Rottler, 5439 Beach Dr. SW., Seattle, WA (US) 98032; Donald B. Rottler, Seattle, WA (US)

(73) Assignee: Andrew Rottler, Seattle, WA (US)

(*) Notice: Under 35 U.S.C. 154(b), the term of this patent shall be extended for 0 days.

(21) Appl. No.: 09/346,260

(22) Filed: Jul. 1, 1999

(51) Int. Cl.⁷ .................................................. B23B 35/00
(52) U.S. Cl. ........................ 408/1 R; 408/130; 408/709
(58) Field of Search ............................. 408/1 R, 10, 13, 408/129, 130, 236, 709

(56) References Cited

U.S. PATENT DOCUMENTS

| | | | |
|---|---|---|---|
| 2,108,823 | * 2/1938 | Lyon | 408/4 |
| 3,260,136 | * 7/1966 | Rottler | 408/75 |
| 3,273,423 | * 9/1966 | Rottler | 408/75 |
| 4,189,871 | * 2/1980 | Rottler et al. | 51/34 J |
| 4,358,229 | * 11/1982 | Rukes | 408/88 |
| 6,099,213 | * 8/2000 | Kammeraad et al. | 408/14 |

* cited by examiner

Primary Examiner—A. L. Wellington
Assistant Examiner—Monica S. Carter
(74) Attorney, Agent, or Firm—Christensen O'Connor Johnson Kindness PLLC

(57) ABSTRACT

An apparatus for cutting a bore in a device includes a boring assembly having a cutting device coupled to a housing. A control system selectively floats the housing above a mounting surface, thereby allowing the housing and associated cutting device to be moved along the mounting surface to a selected position. The control system also selectively clamps the housing to the support surface and selectively tilts the housing to move the cutting device away from a wall of the bore cut by the cutting device.

10 Claims, 2 Drawing Sheets

APPARATUS AND METHOD FOR CUTTING A BORE INCLUDING AUTOMATIC SYSTEM FOR RETRACTING THE CUTTING TOOL

FIELD OF THE INVENTION

This invention relates to an apparatus and method for cutting a bore in a device and more particularly, to a boring apparatus that automatically retracts the cutting tool from the bore upon completion of the boring operation.

BACKGROUND OF THE INVENTION

Boring machines are used in a variety of applications, for example to rebuild engines. More particularly, a spindle having a cutting tool coupled to a distal end is fed into a bore of an engine block. The cutting tool or point is rotated and fed into the bore at a selected rate to drill the bore to a uniform, selected diameter and depth.

A variety of boring machines are currently available that meet various needs in various industries. However, several of these currently available machines leave a scoring or drag back line along the wall of the bore as the cutting tool is retracted out of the bore. Accordingly, there is a need for an improved method and apparatus for creating a bore and retracting the cutting tool from the bore without scoring the inner wall of the bore. It would also be advantageous if this process was done automatically. The present invention fulfills these needs, and provides further related advantages.

SUMMARY OF THE INVENTION

Briefly, the present invention provides an improved apparatus and method for boring a hole in a device, for example an engine block, and more particularly, for retracting the cutting tool from the bore at the completion of the boring operation without scoring the wall of the bore.

In a preferred embodiment, the apparatus for machining a bore includes a cutting device, such as a cutting point, coupled to a housing. The apparatus includes a pneumatic control system that selectively floats the housing above a mounting surface, thereby allowing the housing to be positioned at a selected location, for example to align a spindle carrying the cutting point with the center of an engine block bore. The pneumatic control system also selectively clamps the housing to the mounting surface, at which time the cutting point is rotated and fed into the bore to machine the bore. By clamping the housing to the mounting surface, undesirable motion of the cutting point is minimized. The pneumatic control system also selectively tilts the housing at the completion of the boring operation to tilt the cutting point away from an inner wall of the bore, such that as the cutting point is retracted from the bore, the cutting point will not score the wall.

In a preferred embodiment, the control system includes two grooves provided in a bottom surface of the housing adjacent the mounting surface, that are in fluid communication with a source of fluid. Fluid is selectively provided to one or both or neither of the first and second grooves. When fluid is provided to both the first and second grooves, the housing is substantially uniformly pushed away from the mounting surface to float the housing above the mounting surface. When fluid is provided to only one of the first and second grooves, the housing is pushed away from the mounting surface adjacent the groove to which fluid is provided, thereby tilting the housing. When fluid is not provided to either of the grooves, the housing rests against the mounting surface.

The control system further comprises a pair of pneumatically actuated piston rods provided in cylinder housings that are spaced laterally from each other and are coupled to the source of fluid. Fluid is selectively provided to one or both or neither of the piston rods. When air is provided to both piston rods, the piston rods extend outward from the cylinder housings, and through a variety of couplings, clamp the housing to the mounting surface to substantially prevent movement of the housing relative to the mounting surface. When air is provided to only one of the piston rods, movement of the housing relative to the mounting surface is only partially restricted. When air is not provided to either of the piston rods, the piston rods do not restrain movement of the housing, thereby allowing the housing to be moved freely relative to the mounting surface.

When the boring operation is complete and it is desired to retract the cutting point from the bore, the control system tilts the housing by supplying air to only one of the grooves and to one of the piston rods that is spaced diagonally from the groove to which fluid is provided. By providing air to only one groove, one side of the housing is lifted, thereby tilting the cutting point away from the wall of the bore. The cutting point may therefore be withdrawn without scoring the wall of the bore. Providing air to a diagonally positioned piston rod stabilizes the apparatus by partially immobilizing the housing.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE INVENTION

An improved method and apparatus for machining a bore is provided in accordance with a preferred embodiment of the present invention.

Figure 1:
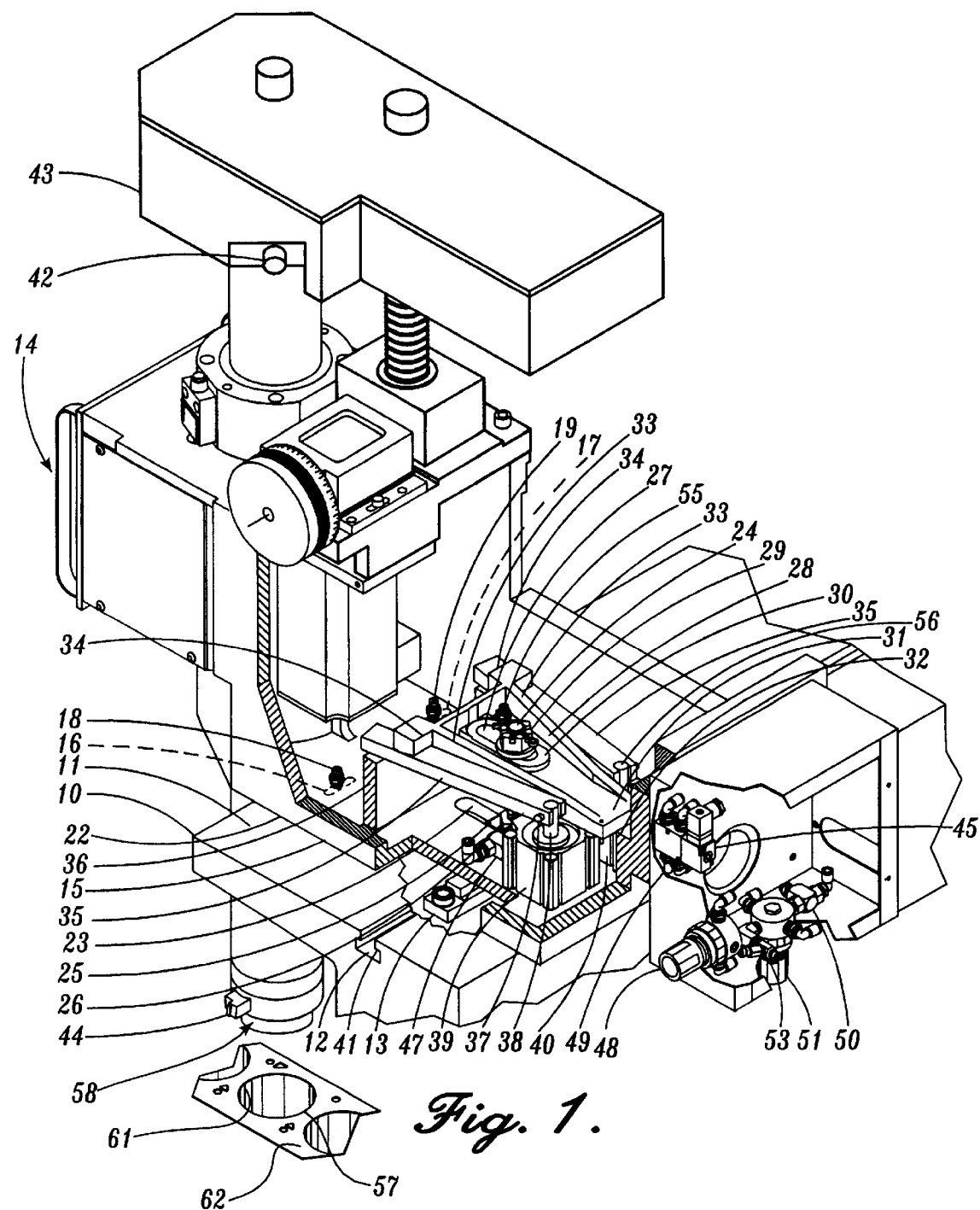
FIG. 1 is an isometric view of a boring apparatus provided in accordance with a preferred embodiment of the present invention.

As illustrated in FIG. 1, an apparatus 14 for cutting a bore 57 in a device, such as an engine block 62, is provided with a boring assembly 58 having a cutting device or point 44 coupled to a housing 15. The housing 15 is positioned on a stationary bed 10 having an upper mounting surface 11. Although the present invention may be applied in a variety of contexts, for purposes of illustration, it will be described in the context of rebuilding an engine, wherein the cutting device 44 is rotated and fed into a bore 61 along a longitudinal axis to machine the bore 61 to a uniform, selected diameter and depth.

In a preferred embodiment of the present invention, the boring apparatus 14 includes a control system 60 that selectively floats the housing 15 above the mounting surface 11, clamps the housing 15 to the mounting surface 11, and tilts the housing 15 to move the cutting device 44 away from a wall 61 of bore 57.

Figure 2:
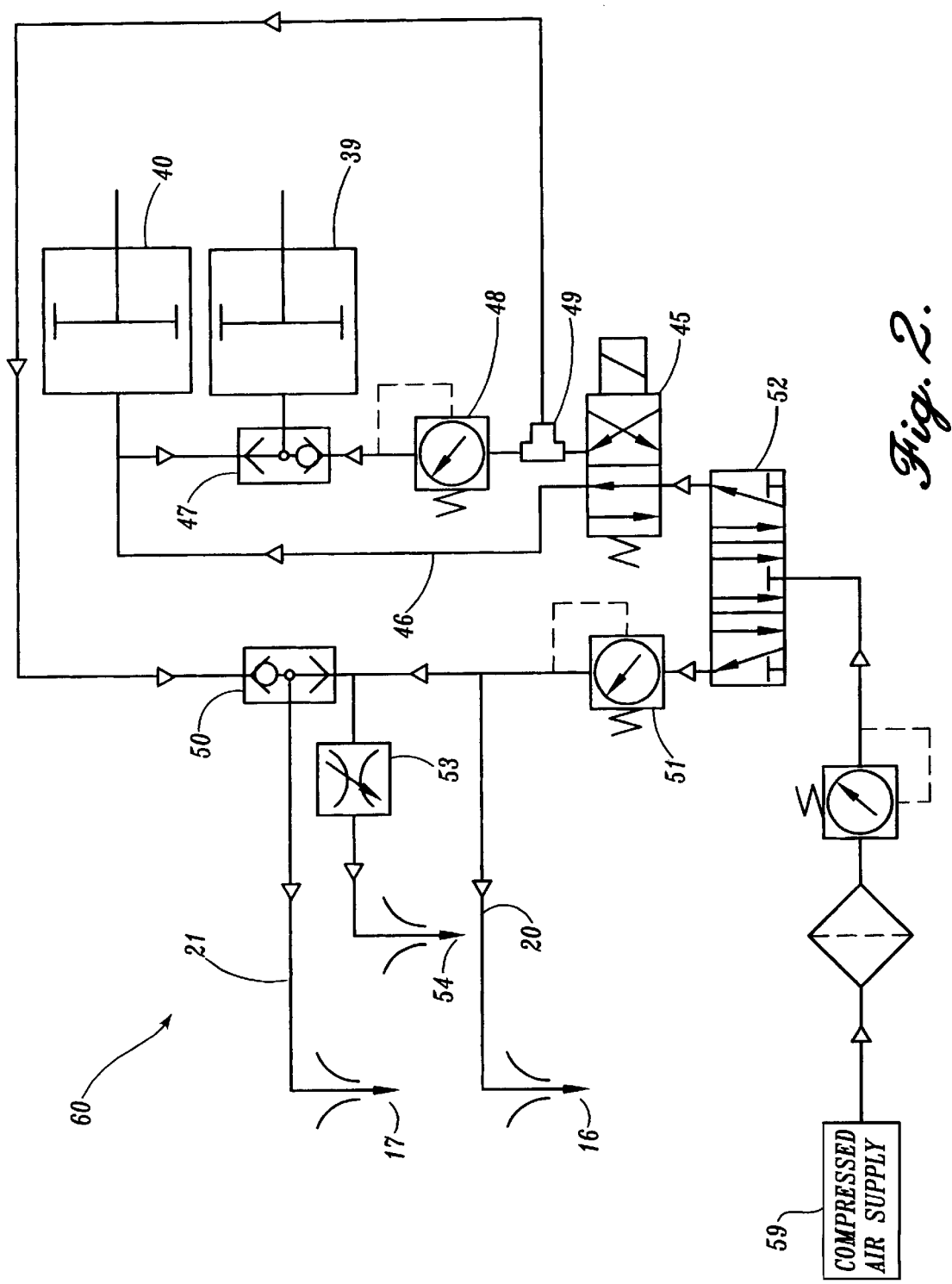
FIG. 2 is a schematic diagram of a pneumatic control system provided in accordance with a preferred embodiment of the present invention.

As best seen in FIG. 1, the mounting surface 11 has a keyway 12 having an inverted T-shaped cross section for receiving an anchoring key 13. When the housing 15 is not clamped to the mounting surface 11, the boring apparatus 14 may be moved laterally along the mounting surface 11. To facilitate the ease of movement of the boring apparatus 14 along the mounting surface 11, the control system 60 floats the housing 15 above the mounting surface 11. In a preferred embodiment, as illustrated in FIGS. 1 and 2, the control system 60 includes a first shallow pocket groove 16 and a second shallow pocket groove 17 formed in a bottom surface 22 of housing 15 adjacent mounting surface 11. The first and second grooves 16, 17 are laterally spaced from each other approximately directly beneath the center of balance of the boring apparatus 14 and are in fluid communication with a source of fluid 59 via air lines 20, 21 and supply ports 18, 19, respectively. Although a variety of fluids may be used, in a preferred embodiment, the source of fluid is high pressure air. When fluid is provided to the first and second grooves 16, 17 against the underlying mounting surface 11, a lift force is generated which pushes the housing 15 away from the mounting surface 11. As a result, it is easier to move the housing 15 along the keyway 12. If in floating the housing 15 it appears that the boring apparatus is unbalanced, it may be balanced by adjusting a needle valve 53 that supplies air to a rear pocket groove 54, as seen in FIG. 2.

As further illustrated in FIG. 1, the housing 15 is provided with a slot 23 in a lower region, the slot 23 allowing the boring apparatus 14 to be centered in a cylinder or bore before beginning a boring process. Riding in the slot 23 is a block 25 through which a pull bolt 24 extends from the anchoring key 13. The pull bolt 24 is provided with a lock nut 26 on the top of the block 25 to lock the block 25 to the anchoring key 13. An upper end of the pull bolt 24 extends through a slot 27 provided in a lever plate 28 to receive a head nut 29 which bears against a rim 30 of the slot 27. The lever plate 28 is pivoted at a rear fulcrum 31 on top of a back stub wall 32 and is provided with two diverging side ribs 33, each of which is provided with a lateral ear 34. Each lateral ear 34 bears against the top of a lever arm 35. Each of the lever arms 35 is fulcrumed on an intermediate stub wall 36 and extends rearwardly, an end region of the lever arms 35 being coupled to a first and second piston 38, 56 via pin connections 37. The first and second pistons 38, 56 are pneumatically actuated by a first and second cylinder unit 39, 40, respectively, the first and second cylinders 39, 40 being anchored to the housing 15.

As illustrated in FIG. 2, the control system 60 selectively provides fluid from the source of fluid 59 to one or both of the first and second cylinders 39, 40 and in turn to the first and second pistons 38, 56. In a preferred embodiment, as illustrated in FIG. 2, fluid is provided from the source of fluid 59 through air line 46 to the second pneumatic cylinder 40 and associated piston 56, and then through a shuttle valve 47 to the first pneumatic cylinder 39 and associated piston 38. When air is provided to the first and second pistons 38, 56, the pistons extend upwardly, causing the lever arms 35 to pivot against the lateral ears 34, which in turn act against lever plate 28 and head nut 29 of pull bolt 24. Because the ears 34 are adjacent the front ends of the lever arms 35, the force exerted by the first and second pistons 38, 56 on the rear ends of the lever arms 35 is multiplied several times to the forward end of the lever plate 28. This force is further multiplied by the lever plate 28 acting against head nut 29 of pull bolt 24, resulting in a concentrated force being exerted by anchoring key 13 against upper shoulders 41 of keyway 12, thereby firmly locking the housing 15 of boring apparatus 14 to the stationary bed 10. Therefore, in accordance with a preferred embodiment of the present invention, the control system 60 selectively clamps the housing 15 to the mounting surface 11 by providing fluid to the first and second pistons 38, 56.

As noted above, the control system 60 also selectively tilts the housing 15 and associated cutting device 44 away from wall 61 of bore 57. In a preferred embodiment, the control system 60, via four-way solenoid valve 45, forces fluid, such as compressed air, through a regulator 48 to reduce its pressure and then through shuttle valve 47 to the first cylinder 39 and associated first piston 38. Control system 60 also sends fluid through a tee fitting 49 at the four-way solenoid valve 45 to a shuttle valve 50 and to second groove 17, as best seen in FIG. 2. By providing air to only one of the first and second grooves 16, 17, the housing 15 is floated only adjacent the one groove, thereby tilting the housing 15, which in turn moves the cutting device 44 away from wall 61 of bore 57. In a preferred embodiment, the apparatus 14 includes a proximity sensor 42 to sense the location of the cutting device 44. Although the proximity sensor 42 may be located in a variety of positions, in a preferred embodiment, as illustrated in FIG. 1, it is coupled to the upper belt housing 43. The control system 60, via proximity sensor 42, positions the cutting device 44 in a location selected for being tilted and retracted out of the bore 57. This positioning may be done via any currently available means, for example via a limit switch or computer program.

As illustrated in FIG. 1, the first and second grooves 16, 17 are spaced along a first axis and the first and second pistons 38, 56 are spaced along a second axis that is substantially parallel to the first axis. As described above, the cutting point may be tilted by supplying air to the second groove 17 and first piston 38, the first piston 38 being spaced diagonally from the second groove 17. Given the direction of resulting tilt to the housing 15, it is desirable to have the cutting device 44 positioned as shown in FIG. 1, prior to tilting the housing and retracting the cutting device 44 out of the bore 57. Alternatively, the same result would be achieved by providing air to the first groove 16, and to the second piston 56, and positioning the cutting device 44 180 degrees from that shown in FIG. 1.

Providing air to a diagonally positioned piston rod stabilizes the apparatus 14 by partially immobilizing the housing 15. A set screw 55 is provided near the lever plate 28 which can be adjusted to ensure that when the first cylinder 39 is activated during the tilt mode, the lever plate 28 is not forced down sufficiently to cause a clamping force on the side of the boring unit adjacent the second groove 17. As a result, the clamping force provided by the single first cylinder 39 stabilizes the unit, without interfering with lift of the housing 15.

Therefore, in operation, the control system 60 floats the housing 15 above mounting surface 11 by providing fluid to both the first and second grooves 16, 17 and to neither of the first and second pistons 38, 56. The housing is then moved along the mounting surface 11 to center the boring assembly 58 and cutting point 44 in a selected position to perform a boring operation. Once the cutting device 44 is positioned appropriately, the control system 60, via valve 52 and solenoid valve 45, clamps the housing 15 to the mounting surface 11 by providing air to the first and second cylinders 39, 40 and associated pistons 38, 56, and to neither of the first and second grooves 16, 17. The cutting device 44 is activated to cut a bore having a selected diameter and depth. Once the boring operation is complete, the control system 60, again through valve 52 and solenoid valve 45, tilts the housing 15 and associated cutting device 44 by providing air to only one of the first and second grooves 16, 17 and to one of the first and second pistons 38, 56 spaced diagonally from the groove to which air is provided. The control system also moves the cutting device 44 to a selected location. The cutting device 44 is then retracted out of the bore 57, the cutting device 44 being moved away from the wall 61 such that the cutting device 44 does not contact the wall as the cutting device is retracted out of the bore. It will be understood that although the various modes of operation, namely float, clamp and tilt may be selected manually by an operator, in a preferred embodiment, the operation of the control system is automated, for example via a computer program.

While preferred embodiments of the invention have been illustrated and described, it will be appreciated that various changes can be made therein without departing from the spirit of the invention. Thus, the present invention is not limited to the embodiments described herein, but rather is defined by the claims which follow.

The embodiments of the invention in which an exclusive property or privilege is claimed are defined as follows:

What is claimed is:

1. An apparatus for cutting a bore comprising:

a boring assembly having a cutting device coupled to a housing, a first groove and a second groove being provided in a bottom surface of the housing adjacent a mounting surface on which the housing is positioned, the first and second grooves being laterally spaced from each other and being in fluid communication with a source of fluid that is selectively provided to one of the first and second grooves, the housing being pushed away from the mounting surface when fluid is provided to one or both of the first and second grooves;

a first piston and a second piston spaced laterally from each other and in fluid communication with the source of fluid, fluid being selectively provided to one of the first and second pistons, the first and second pistons being coupled to the housing and resisting movement of the housing along the mounting surface when fluid is provided to one or both of the first and second pistons; and a control system coupled to the cutting device and to the source of fluid, the control system forcing fluid to flow to one of the first and second grooves and to one of the first and second pistons to tilt the cutting device away from a wall of a bore cut by the cutting device.

2. The apparatus according to claim 1 wherein the first and second grooves are positioned along a first axis and the first and second pistons are positioned along a second axis that is substantially parallel to the first axis, and the control system forces fluid to flow to one of the first and second pistons that is spaced diagonally from the one of the first and second grooves to which the control system forces fluid to tilt the cutting device away from the wall of the bore.

3. The apparatus according to claim 1 wherein the control system moves the cutting device to a selected position prior to tilting the cutting device away from the wall of the bore.

4. An apparatus for cutting a bore comprising:

a cutting device coupled to a housing, the cutting device being rotatable and moveable along a longitudinal axis, the cutting device being rotated and advanced along the longitudinal axis to cut a bore; and a control system that selectively floats the housing above a mounting surface, allowing the housing and associated cutting device to be moved along the mounting surface to a selected position, the control system selectively clamping the housing to the support surface and selectively tilting the housing to move the cutting device away from a wall of the bore cut by the cutting device.

5. The apparatus according to claim 4 wherein the control system further comprises a first groove and a second groove provided in a bottom surface of the housing adjacent the mounting surface, the first and second grooves being laterally spaced from each other;

a first piston and a second piston coupled to the housing and spaced laterally from each other; and a source of fluid that selectively provides fluid to one or both of the first and second grooves, the housing being pushed away from the mounting surface when fluid is provided to one or both of the first and second grooves, the source of fluid selectively providing fluid to one or both of the first and second pistons, movement of the housing along the mounting surface being restricted by the provision of fluid to one or both of the first and second pistons.

6. The apparatus according to claim 5 wherein the control system senses the location of the cutting device and moves the cutting device to a selected position and forces fluid to flow to one of the first and second grooves and to one of the first and second pistons when it is desired to tilt the cutting device away from the wall of the bore.

7. A method for cutting a bore comprising:

floating a housing away from a mounting surface, the housing being provided with a cutting device;

positioning the cutting device at a selected location;

clamping the housing to the mounting surface;

activating the cutting device to cut a bore having a selected diameter and depth;

tilting the housing and associated cutting device to move the cutting device away from a wall of the bore; and retracting the cutting device out of the bore.

8. The method according to claim 7 wherein the step of tilting the housing further comprises the steps of forcing fluid to flow to one of a first groove and a second groove provided in a bottom surface of the housing adjacent the mounting surface; and forcing fluid to one of a first piston and a second piston coupled to the housing and to the mounting surface.

9. The method according to claim 7 further comprising the step of positioning the cutting device in a selected position prior to tilting the housing and retracting the cutting device out of the bore.

10. The method according to claim 7 wherein the step of floating the housing further comprises forcing fluid to flow to both a first groove and a second groove provided in a bottom surface of the housing adjacent the mounting surface, and the step of clamping the housing further comprises forcing fluid to flow to both a first piston and a second piston coupled to the housing and to the mounting surface.

* * * * *